United States Patent
Phinisee et al.

(10) Patent No.: US 12,235,390 B2
(45) Date of Patent: Feb. 25, 2025

(54) SENSOR ASSEMBLY WITH DUCT

(71) Applicants: Ford Global Technologies, LLC, Dearborn, MI (US); Valeo North America, Inc., Troy, MI (US)

(72) Inventors: Rashaun Phinisee, Ypsilanti, MI (US); Raghuraman Surineedi, Dearborn, MI (US); Venkatesh Krishnan, Canton, MI (US); Michael Whitney, Auburn Hills, MI (US); Victoria Bos, Troy, MI (US); Luis Angel Gonzalez, Seymour, IN (US)

(73) Assignees: Ford Global Technologies, LLC, Dearborn, MI (US); Valeo North America, Inc., Troy, MI (US)

( * ) Notice: Subject to any disclaimer, the term of this patent is extended or adjusted under 35 U.S.C. 154(b) by 1040 days.

(21) Appl. No.: 17/182,371

(22) Filed: Feb. 23, 2021

(65) Prior Publication Data

US 2022/0268892 A1 Aug. 25, 2022

(51) Int. Cl.
*G01S 7/481* (2006.01)
*G01S 7/497* (2006.01)
*G01S 17/931* (2020.01)

(52) U.S. Cl.
CPC .......... *G01S 7/4813* (2013.01); *G01S 17/931* (2020.01); *G01S 2007/4977* (2013.01)

(58) Field of Classification Search
None
See application file for complete search history.

(56) References Cited

U.S. PATENT DOCUMENTS

| | | | |
|---|---|---|---|
| 10,011,251 B2 | 7/2018 | Gokan et al. | |
| 10,761,190 B1 * | 9/2020 | Sykula | G01S 17/931 |
| 10,802,121 B1 * | 10/2020 | Krishnan | G01S 17/931 |
| 2006/0152705 A1 * | 7/2006 | Yoshida | G01S 7/4813 |
| | | | 356/28 |
| 2018/0354468 A1 * | 12/2018 | Krishnan | B60S 1/56 |
| 2019/0235054 A1 * | 8/2019 | Ratner | G01S 17/42 |
| 2020/0370665 A1 | 11/2020 | Maurer Geza et al. | |

FOREIGN PATENT DOCUMENTS

| | | | |
|---|---|---|---|
| CN | 03920685 U | 11/2014 | |
| EP | 2605043 A1 * | 6/2013 | G01S 17/936 |
| WO | 2018017395 A1 | 1/2018 | |

* cited by examiner

*Primary Examiner* — Eric L Bolda
(74) *Attorney, Agent, or Firm* — Frank A. MacKenzie; Brooks Kushman P.C.

(57) ABSTRACT

A sensor assembly includes a housing defining a chamber. The sensor assembly includes a sensor supported by the housing. The sensor assembly includes a duct extending from a first end to a second end, the first end of the duct being open to an environment external to the chamber and the second end being fluidly connected to the chamber. The duct includes a first portion at the first end, a second portion at the second end, and a middle portion between the first portion and the second portion. The middle portion extends downward from the first portion, and the second portion extends upward to the second end.

19 Claims, 4 Drawing Sheets

SENSOR ASSEMBLY WITH DUCT

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

Figure 1:
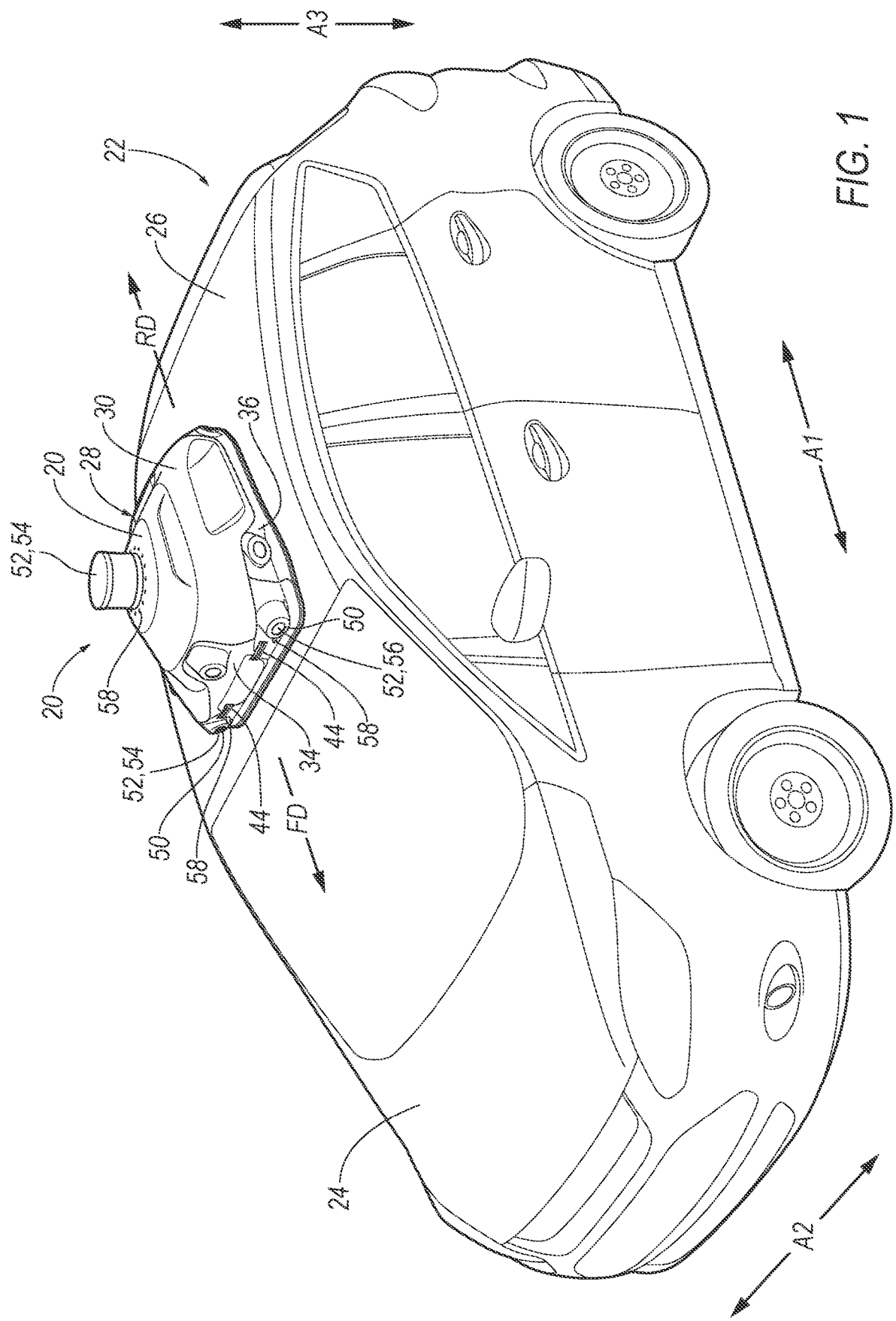
FIG. 1 is a perspective view of a sensor assembly mounted on a vehicle.

A sensor assembly includes a housing defining a chamber. The sensor assembly includes a sensor supported by the housing. The sensor assembly includes a duct extending from a first end to a second end, the first end of the duct being open to an environment external to the chamber and the second end being fluidly connected to the chamber. The duct includes a first portion at the first end, a second portion at the second end, and a middle portion between the first portion and the second portion. The middle portion extends downward from the first portion, and the second portion extends upward to the second end.

The sensor assembly may include a blower having an intake and an exhaust, the intake connected to the duct at the second end and the exhaust oriented to blow into the chamber.

The housing may define a second chamber fluidly isolated from the chamber.

The housing may include a first opening connected to the first end of the duct and a second opening fluidly connected to the second chamber, and the second opening may face in an opposite direction than the first opening.

The middle portion and the second portion may be elongated parallel to each other.

The first portion may extend perpendicular to the middle portion.

The duct may include an impact wall extending vertically along the middle portion.

A cross-sectional area of the first portion may be less than a cross-sectional area of the second portion.

A cross-sectional area of the middle portion may be less than the cross-sectional area of the second portion.

The duct may include a connecting portion extending from the middle portion to the second portion.

The connecting portion may extend horizontally from the middle portion to the second portion.

A bottom wall of the connecting portion may define a low point, and the duct may include a drain hole at the low point.

The first portion may extend toward the middle portion and upward from the first end.

The housing may define an opening and include a lip surrounding the opening and disposed within the first end of the duct.

The sensor may be a LIDAR sensor supported at a top of the housing, the sensor assembly may include a nozzle in fluid communication with the chamber and oriented to blow across the LIDAR sensor.

The housing may include a sensor window, and the sensor assembly may include a nozzle in fluid communication with the chamber and oriented to blow across the sensor window.

The first portion may include a top wall, the middle portion may include an impact wall, and the top wall may be perpendicular to the impact wall.

The top wall may intersect the impact wall at a right angle.

With reference to the Figures, wherein like numerals indicate like parts throughout the several views, a sensor assembly 20 for collecting data to autonomously operate a vehicle 22 includes a housing 28 defining a first chamber 38. The sensor assembly 20 includes a sensor supported by the housing 28. The sensor assembly 20 includes a duct 60 extending from a first end 62 to a second end 64 and fixed to the housing 28, the first end 62 of the duct 60 being open to an environment external to the first chamber 38 and the second end 64 being fluidly connected to the first chamber 38. The duct 60 includes a first portion 66 at the first end 62, a second portion 74 at the second end 64, and a middle portion 82 between the first portion 66 and the second portion 74. The middle portion 82 extends downward from the first portion 66, and the second portion 74 extends upward to the second end 64. The middle portion 82 and the second portion 74 separate liquid, e.g., water droplets, from ambient air that enters the duct 60 and flows to the first chamber 38.

With reference to FIG. 1, the vehicle 22 may be any passenger or commercial automobile such as a car, a truck, a sport utility vehicle, a crossover, a van, a minivan, a taxi, a bus, etc.

In the present application, relative vehicular orientations and directions (by way of example, top, bottom, front, rear, outboard, inboard, inward, outward, lateral, left, right, forward, rearward, etc.) is from the perspective of the vehicle. The forward direction FD of the vehicle 22 is the direction of movement of the vehicle 22 when the vehicle 22 is engaged in forward drive with wheels of the vehicle 22 pointed straight. Orientations and directions relative to the sensor assembly 20 are given related to when the assembly is supported by the vehicle 22 as described below and shown in the Figures.

The vehicle 22 may be an autonomous vehicle. A vehicle computer can be programmed to operate the vehicle 22 independently of the intervention of a human driver, completely or to a lesser degree. The vehicle 22 computer may be programmed to operate a propulsion, brake system, steering, and/or other vehicle 22 systems based at least in part on data received from the sensor assembly 10, as well as other sensors 52. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 22 includes a body 24. The vehicle 22 may be of a unibody construction, in which a frame and the body 24 of the vehicle are a single component. The vehicle 22 may, alternatively, be of a body-on-frame construction, in which the frame supports the body 24 that is a separate component from the frame. The frame and body 24 may be formed of any suitable material, for example, steel, aluminum, etc. The body 24 includes body panels partially defining an exterior of the vehicle 22. The body panels may present a class-A surface, e.g., a finished surface exposed to view by a customer and free of unaesthetic blemishes and defects. The body panels include, e.g., a roof 26, etc.

The housing 28 of the sensor assembly 20 is attachable to one of the body panels of the vehicle 22, e.g., the roof 26. For example, the housing 28 may be shaped to be attachable to the roof 26, e.g., may have a shape matching a contour of the roof 26. The housing 28 may be attached to the roof 26, which can provide the sensors 52 with an unobstructed field of view of an area around the vehicle 22. The housing 28 may be formed of, e.g., plastic or metal.

Figure 2:
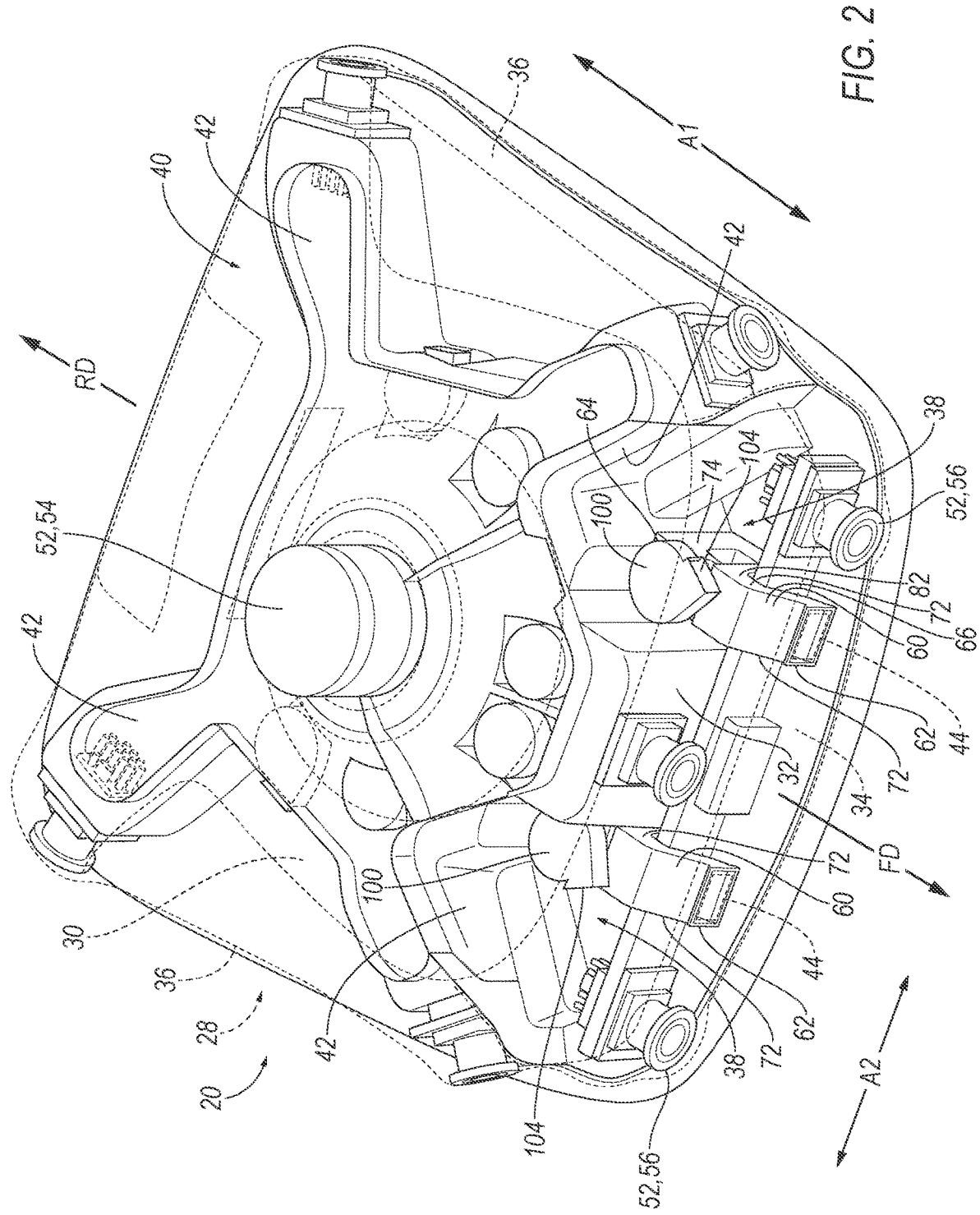
FIG. 2 is a perspective view of the sensor assembly.

With reference to FIG. 2, the housing 28 may include an upper housing portion 30, a lower housing portion 32, a front housing portion 34, and/or side housing portions 36. The housing portions 30, 32, 34, 36 are shaped to fit together, with the upper housing portion 30 fitting on top of the lower housing portion 32, the front housing portion 34 at a front of the sensor assembly 20, and the side housing portions 36. The upper housing portion 30 covers the lower housing portion 32. The housing portions 30, 32, 34, 36 are each a single piece, i.e., are a continuous piece of material with no internal seams separating multiple pieces. For example, the housing portions 30, 32, 34, 36 may each be stamped or molded as a single piece.

The housing 28 defines one or more chambers, e.g., the first chamber 38, a second chamber 40, etc. For example, the first chamber 38 and the second chamber 40 may be enclosed between the upper housing portion 30 and the lower housing portion 32. The first chamber 38 may be further defined by the front housing portion 34. The first chamber 38 may be in front of the second chamber 40. For example, the first chamber 38 may be at a front of the housing 28 and the second chamber 40 may be at a rear of the housing 28.

The first chamber 38 and the second chamber 40 may be fluidly isolated from each other, i.e., such that fluid is restricted from flowing from the first chamber 38 to the second chamber 40, and vice versa. For example, the lower housing portion 32 may include vertically extending walls 42 sealed to the upper housing portion 30. As another example, baffles may be disposed between the upper housing portion 30 and the lower housing portion 32. The baffles may separate the first chamber 38 and the second chamber 40 from each other. The baffles may be foam, or any suitable material.

Figure 3:
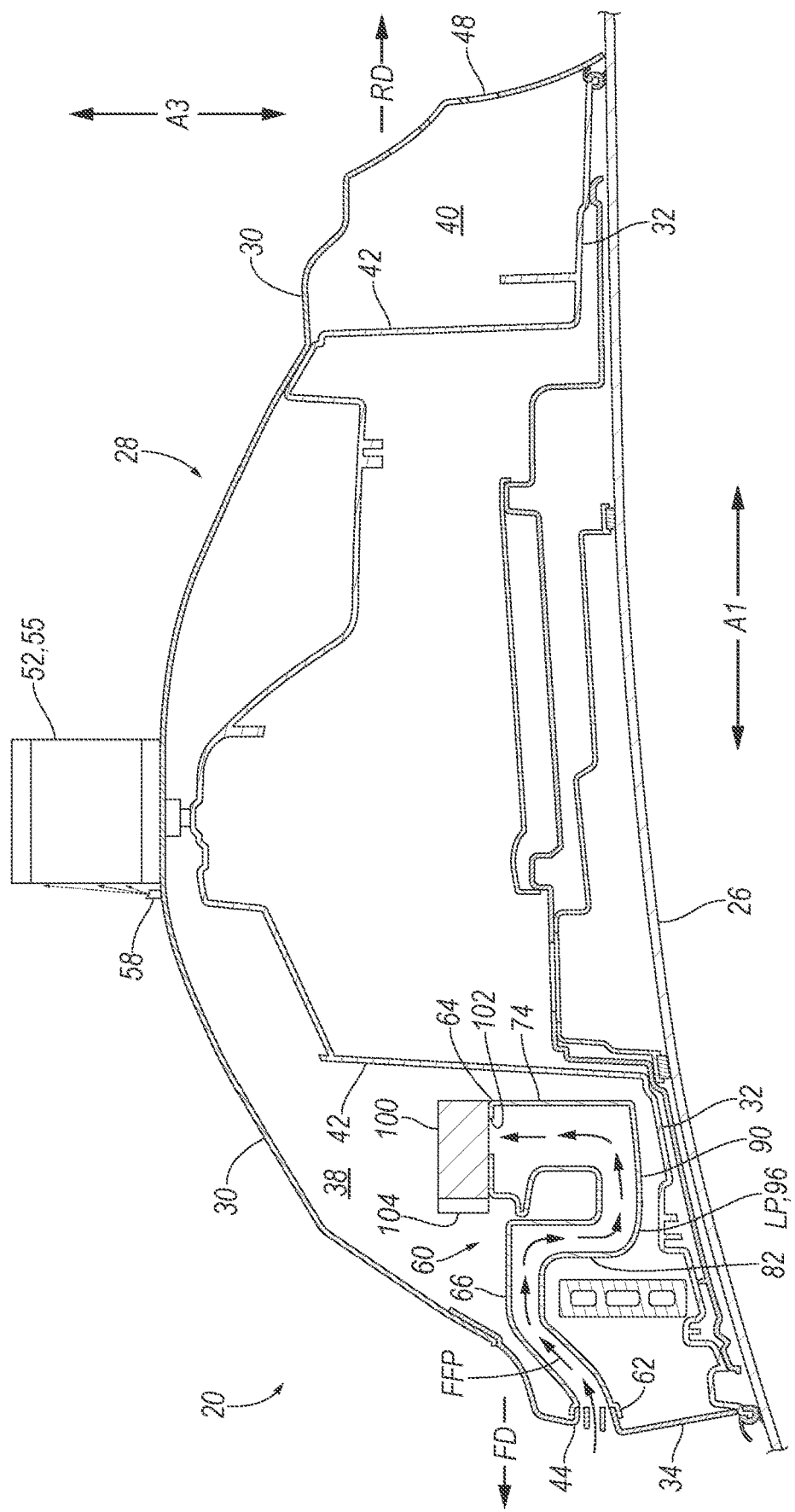
FIG. 3 is a cross section of the sensor assembly.
Figure 4:
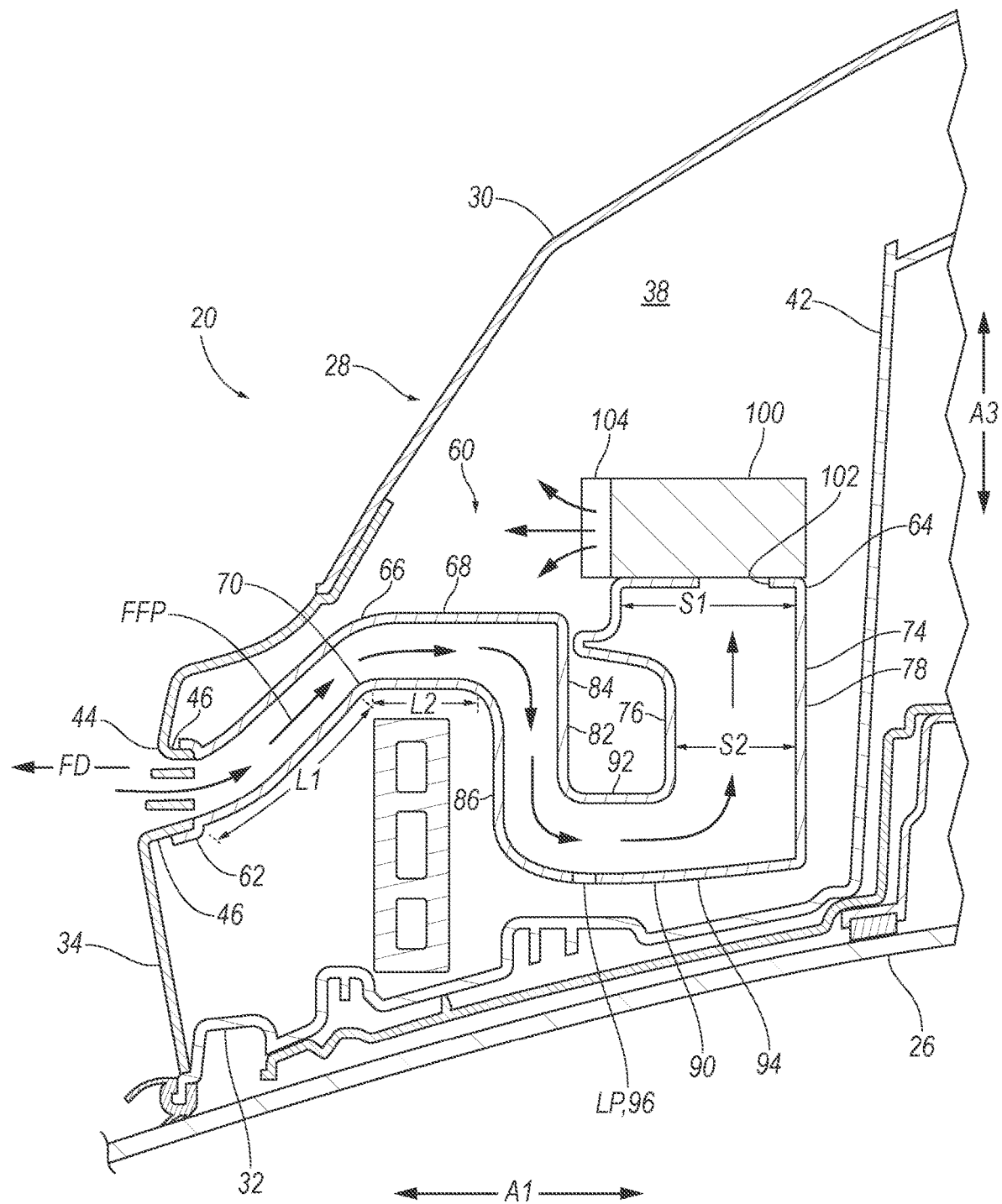
FIG. 4 is a cross section of the sensor assembly.

With reference to FIG. 3, the housing 28 may include a first opening 44. The first opening 44 enables ambient air to enter the duct 60. The first opening 44 may extend through the housing 28. The first opening 44 may be at the front of the housing 28. The first opening 44 may face a forward direction FD. For example, the first opening 44 may extend through the front housing portion 34. The housing 28, e.g., the front housing portion 34, may include a lip 46 (as shown in FIG. 4) surrounding the first opening 44. The lip 46 may extend rearward to a distal end. The lip 46 may extend into the first chamber 38.

The housing 28 may include a second opening 48 fluidly connected to the second chamber 40, i.e., such that fluid may flow from the second opening 48 to the second chamber 40. The second opening 48 enables ambient air to enter the second chamber 40. For example, the second opening 48 may extend through the upper housing portion 30. The second opening 48 may be at the rear of the housing 28. The second opening 48 may face in an opposite direction than the first opening 44. For example, the second opening 48 may face a rearward direction RD.

Returning to FIG. 1, the housing 28 may include one or more sensor windows 50. The sensor windows 50 may be fixed relative to and mounted to the housing 28. The sensor windows 50 are transparent with respect to a medium that the sensors 52 can detect, e.g., visible light detectable by a camera 56 of the sensors 52. For example, the sensor windows 50 can be, e.g., safety glass, i.e., two layers of glass attached to a vinyl layer; polycarbonate; etc.

The sensors 52 supported by the housing 28 may collect data for autonomously operating the vehicle 22. The sensors 52 may be, for example, radar sensors, scanning laser range finders, light detection and ranging (LIDAR) devices, and image processing sensors such as the cameras 56. For example, the sensors 52 may include a LIDAR sensor 54 supported at a top of the housing 28. For example, the upper housing portion 30 may include a top opening, and the lower housing portion 32 may include a plateau. The LIDAR sensor 54 may be fixed to the plateau and extend upward through the top opening. As another example, the sensors 52 may include one more cameras 56 disposed within the first chamber 38, e.g., fixed to the lower housing portion 32. The camera 56 may be oriented to face the sensors 52 windows, i.e., such that light traveling through the sensor windows 50 may be detected by the cameras 56.

With reference to FIG. 3, the sensor assembly 20 may include one or more nozzles 58 in fluid communication with the first chamber 38, i.e., such that fluid may flow from the first chamber 38 to, and through, the nozzles 58. One or more of the nozzles 58 may be oriented to blow across the LIDAR sensor 54, i.e., such that fluid exiting the nozzles 58 travels across field of view of the LIDAR sensor 54 and/or along an outer surface of the LIDAR sensor 54. For example, one or more nozzles 58 may be proximate the top opening and oriented to blow upward and/or toward the top opening. One or more of the nozzles 58 may be oriented to blow across the sensor window, i.e., such that fluid exiting the nozzles 58 travels across fields of view of the cameras 56 and/or along outer surfaces of the transparent shields of the sensor windows 50.

With reference to FIG. 4, the duct 60 of the sensor assembly 20 receives ambient air, e.g., from the first opening 44, and separates liquid from the ambient air before exhausting the ambient air into the first chamber 38. The duct 60 may be supported by the housing 28, e.g., in the first chamber 38. The duct 60 may be fixed to the lower housing portion 32 via fasteners or the like.

The duct 60 extends from the first end 62 to the second end 64. The first end 62 of the duct 60 is open to the environment external the first chamber 38, i.e., such that fluid from the environment external to the first chamber 38 may enter the duct 60 at the first end 62. The first end 62 of the duct 60 may face forward. The first end 62 of the duct 60 may be at the front of the housing 28. The first opening 44 of the housing 28 may be connected to the first end 62 of the duct 60. For example, the first end 62 of the duct 60 may be attached to the upper housing portion 30 at the lip 46. The lip 46 may be disposed within the first end 62 of the duct 60. For example, the lip 46 may extend rearward from the first opening 44 into the first end 62 of the duct 60. The second end 64 is fluidly connected to the first chamber 38, i.e., such that fluid, such as ambient air, may flow from the second end 64 of the duct 60 into the first chamber 38.

The first portion 66 of the duct 60 is at the first end 62 of the duct 60. For example, the first portion 66 may extend rearward from the first end 62. The duct 60 may extend rearward and upward toward the middle portion 82 from the first end 62 along, e.g., a first length L1 of the first portion 66. The duct 60 may extend directly rearward along a second length L2 of the first portion 66. The first portion 66 may be elongated along a longitudinal axis A1 that extends from the from the front to the rear of the sensor assembly 20, i.e., the first portion 66 may be longer along the longitudinal axis A1 than along a lateral axis A2 and a vertical axis A3 that are perpendicular to the longitudinal axis A1 and each other. The elongation of the first portion 66 may direct air flowing through the first portion 66 at an impact wall 84, e.g., to separate water from the air.

The first portion 66 of the duct 60 may include a top wall 68. The first portion 66 of the duct 60 may include a bottom wall 70 below the top wall 68. The top wall 68 is spaced from the bottom wall 70 along the vertical axis A3. The first portion 66 of the duct 60 may include a pair of side walls 72 (as shown in FIG. 2) extending from the top wall 68 to the bottom wall 70. The side walls 72 may be spaced from each other along the lateral axis A2.

The second portion 74 of the duct 60 is at the second end 64 of the duct 60. For example, the second portion 74 may extend downward from the second end 64, e.g., along the vertical axis A3. The second portion 74 may be elongated along the vertical axis A3. The second portion 74 of the duct 60 may include a front wall 76 and a rear wall 78. The front wall 76 may be spaced from front wall 76 along the longitudinal axis A1. A first spacing S1 between the front wall 76 and the rear wall 78 proximate the second end 64 may be greater than a second spacing S2 between the front wall 76 and the rear wall 78 away from the second end 64. The second portion 74 of the duct 60 may include the pair of side walls 72, e.g., extending from the front wall 76 to the rear wall 78. The side walls 72 may be spaced from each other along the lateral axis A2.

The middle portion 82 of the duct 60 is between the first portion 66 and the second portion 74, e.g., along a fluid flow path FFP through the duct 60. The middle portion 82 may be rearward of the first portion 66. The middle portion 82 extends downward from the first portion 66, e.g., along the vertical axis A3. The first portion 66, specifically the second length L2, may extend perpendicular to the middle portion 82, e.g., the first portion 66 may extend along the longitudinal axis A1 and the middle portion 82 may extend along the vertical axis A3. The middle portion 82 and the second portion 74 may be elongated parallel to each other, e.g., both along the vertical axis A3.

The middle portion 82 may include the impact wall 84. The impact wall 84 aids in separating liquid from ambient air flowing through the duct 60, e.g., the liquid may condensate or otherwise adhere to the impact wall 84, whereas the ambient air may not. The impact wall 84 may extend downward from the top wall 68 of the first portion 66. The impact wall 84 may extend perpendicular to the top wall 68 of the first portion 66. For example, the impact wall 84 may extend vertically, e.g., along the vertical axis A3, and the top wall 68 may extend horizontally along the longitudinal axis A1. As another example, the top wall 68 may intersect the impact wall 84 at a right angle. The middle portion 82 may include a front wall 86 forward of the impact wall 84. The front wall 76 may be spaced from the impact wall 84 along the longitudinal axis A1. The front wall 76 may extend downward from the bottom wall 70 of the first portion 66. The middle portion 82 of the duct 60 may include the pair of side walls 72, e.g., extending from the impact wall 84 to the front wall 76. The side walls 72 may be spaced from each other along the lateral axis A2.

The duct 60 may include a connecting portion 90 between the middle portion 82 and the second portion 74, e.g., along the fluid flow path FFP through the duct 60. The connecting portion 90 may extend from the middle portion 82 to the second portion 74, e.g., horizontally along the longitudinal axis A1. The second portion 74 may extend upward from the connecting portion 90 to the second end 64, e.g., along the vertical axis A3. The connecting portion 90 may include a top wall 92. The connecting portion 90 of the duct 60 may include a bottom wall 94 below the top wall 92. The top wall 92 is spaced from the bottom wall 94 along the vertical axis A3. The bottom wall 94 of the connecting portion 90 may define a low point LP. The low point LP is lower than a remainder of the bottom wall 70, e.g., along the vertical axis A3. Gravity may urge fluid on the bottom wall 94 toward the low point LP. The duct 60 may include a drain hole 96 at the low point LP. The drain hole 96 may extend though the bottom wall 94 at the low point LP. The connecting portion 90 of the duct 60 may include a pair of side walls 72 extending from the top wall 68 to the bottom wall 70. The side walls 72 may be spaced from each other along the lateral axis A2.

The duct 60 defines a plurality of cross-sectional areas at positions along the fluid flow path FFP through the duct 60, and with the fluid flow path FFP normal to the cross-sectional areas. For example, a cross-sectional area of the first portion 66 may be defined as an area of the first portion 66 orthogonal to the fluid flow path FFP, e.g., for a rectangular cross-section, a length of the bottom wall 70 or the top wall 68 between the side walls 72 multiplied by a length of one of the side walls 72 between the bottom wall 70 and the top wall 68 at a position along the first portion 66. As another example, a cross-sectional area of the second portion 74 may be defined as an area of the second portion 74 orthogonal to the fluid flow path FFP, e.g., for a rectangular cross-section, a length of the front wall 76 or the rear wall 78 between the side walls 72 multiplied by a length of one of the side walls 72 between the front wall 76 and the rear wall 78 at a position along the second portion 74. As another example, a cross-sectional area of the middle portion 82 may be defined as an area of the middle portion 82 orthogonal to the fluid flow path FFP, e.g., for a rectangular cross-section, a length of the impact wall 84 or the front wall 86 between the side walls 72 multiplied by a length of one of the side walls 72 between the impact wall 84 and the front wall 86 at a position along the first portion 66. The cross-sectional areas of the first portion 66 and/or the middle portion 82 may be less than the cross-sectional area of the second portion 74. The lower cross-sectional area of the first portion 66 and the middle portion 82 provides higher fluid velocities in the first portion 66 and the middle portion 82 than in the second portion 74, e.g., for a set volumetric flow rate of fluid through the duct 60. The higher fluid velocities in the first portion 66 and the middle portion 82 may increase the effectiveness of the impact wall 84, e.g., the higher fluid velocities may provide a higher impact velocity of the air and liquid against the impact wall. The lower fluid velocities in the second portion 74 decrease liquid dawn up through the second portion 84 to the second end 64.

The sensor assembly 20 may include a blower 100 having an intake 102 and an exhaust 104. The blower 100 in an on-state may urge fluid from the intake 102 to the exhaust 104. The blower 100 in the on-state may generate negative pressure at the intake 102 and positive pressure at the exhaust 104. The blower 100 may include a motor, a fan with blades, a wheel with vanes, or any other suitable structure. The intake 102 of the blower 100 may be connected to the duct 60 at the second end 64, e.g., such that the blower 100 in the on-state may generate negative pressure in the duct 60. The exhaust 104 of the blower 100 may be oriented to blow into the first chamber 38, e.g., such that the blower 100 in the on-state may generate positive pressure in the first chamber 38.

During normal operation of the vehicle 22, e.g., when the vehicle 22 is traveling in the forward direction FD and/or when the blower 100 is in the on-state, air may flow into the duct 60 at the first end 62, e.g., via the first opening 44, and along the fluid flow path FFP. The air may include a mix of gas and liquid, e.g., ambient air and rain droplets or the like. The gas-liquid mixture may flow through the first portion 66 of the duct 60 and into the impact wall 84 of the middle portion 82. Liquid from the mix has greater momentum than the air and may strike the impact wall 84 and separate out of the mixture. The liquid may flow down the impact wall 84, falling to the bottom wall 94 of the connecting portion 90 before flowing out the drain hole 96. The ambient air, less the liquid separated from the mixture, may flow up through the second portion 74 and through the blower 100 to the first chamber 38. The air may pressurize the first chamber 38, i.e., such that pressure in the first chamber 38 is greater than ambient pressure outside the housing 28. The air from the pressurized first chamber 38 may flow out the nozzles 58, e.g., across the cameras 56 and the LIDAR sensor 54.

The adjectives "first," "second," etc., are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor assembly, comprising:
    a housing defining a chamber;
    a sensor supported by the housing;
    a duct extending from a first end to a second end, the first end of the duct being open to an environment external to the chamber and the second end being fluidly connected to the chamber;
    the duct including a first portion at the first end, a second portion at the second end, and a middle portion between the first portion and the second portion; and
    the middle portion extending downward from the first portion, and the second portion extending upward to the second end;
    a blower having an intake and an exhaust, the intake connected to the duct at the second end and the exhaust oriented to blow into the chamber; and
    wherein the housing defines an opening and includes a lip surrounding the opening and disposed within the first end of the duct.

2. The sensor assembly of claim 1, wherein the housing defines a second chamber fluidly isolated from the chamber.

3. The sensor assembly of claim 2, wherein the housing includes a first opening connected to the first end of the duct and a second opening fluidly connected to the second chamber, and wherein the second opening faces in an opposite direction than the first opening.

4. The sensor assembly of claim 1, wherein the middle portion and the second portion are elongated parallel to each other.

5. The sensor assembly of claim 4, wherein the first portion extends perpendicular to the middle portion.

6. The sensor assembly of claim 1, wherein the duct includes an impact wall extending vertically along the middle portion.

7. The sensor assembly of claim 1, wherein a cross-sectional area of the first portion is less than a cross-sectional area of the second portion.

8. The sensor assembly of claim 7, wherein a cross-sectional area of the middle portion is less than the cross-sectional area of the second portion.

9. The sensor assembly of claim 1, wherein the duct includes a connecting portion extending from the middle portion to the second portion.

10. The sensor assembly of claim 9, wherein the connecting portion extends horizontally from the middle portion to the second portion.

11. The sensor assembly of claim 9, wherein a bottom wall of the connecting portion defines a low point, and the duct includes a drain hole at the low point.

12. The sensor assembly of claim 1, wherein the first portion extends toward the middle portion and upward from the first end.

13. The sensor assembly of claim 1, wherein the sensor is a LIDAR sensor supported at a top of the housing, and further comprising a nozzle in fluid communication with the chamber and oriented to blow across the LIDAR sensor.

14. The sensor assembly of claim 1, wherein the housing includes a sensor window, and further comprising a nozzle in fluid communication with the chamber and oriented to blow across the sensor window.

15. The sensor assembly of claim 1, wherein the first portion includes a top wall, the middle portion includes an impact wall, and the top wall is perpendicular to the impact wall.

16. The sensor assembly of claim 15, wherein the top wall intersects the impact wall at a right angle.

17. A sensor assembly, comprising:
    a housing defining a first chamber and a second chamber fluidly isolated from the first chamber;
    a sensor supported by the housing; and
    a duct extending from a first end to a second end, the first end of the duct being open to an environment external to the first chamber and the second end being fluidly connected to the first chamber;
    the duct including a first portion at the first end, a second portion at the second end, and a middle portion between the first portion and the second portion; and
    the middle portion extending downward from the first portion, and the second portion extending upward to the second end.

18. The sensor assembly of claim 17, wherein the housing includes a first opening connected to the first end of the duct and a second opening fluidly connected to the second chamber, and wherein the second opening faces in an opposite direction than the first opening.

19. A sensor assembly, comprising:
    a housing defining a chamber and including a sensor window;
    a sensor supported by the housing;
    a duct extending from a first end to a second end, the first end of the duct being open to an environment external to the chamber and the second end being fluidly connected to the chamber; and
a nozzle in fluid communication with the chamber and oriented to blow across the sensor window;
the duct including a first portion at the first end, a second portion at the second end, and a middle portion between the first portion and the second portion; and
the middle portion extending downward from the first portion, and the second portion extending upward to the second end.

* * * * *